US007692142B2

(12) United States Patent
Schwartz et al.

(10) Patent No.: US 7,692,142 B2
(45) Date of Patent: Apr. 6, 2010

(54) DIFFERENTIAL-PRESSURE DUAL ION TRAP MASS ANALYZER AND METHODS OF USE THEREOF

(75) Inventors: Jae C. Schwartz, San Jose, CA (US); John E. P. Syka, Charlottesville, VA (US); Scott T. Quarmby, Round Rock, TX (US)

(73) Assignee: Thermo Finnigan LLC, San Jose, CA (US)

( * ) Notice: Subject to any disclaimer, the term of this patent is extended or adjusted under 35 U.S.C. 154(b) by 581 days.

(21) Appl. No.: 11/639,273

(22) Filed: Dec. 13, 2006

(65) Prior Publication Data

US 2008/0142705 A1 Jun. 19, 2008

(51) Int. Cl.
*B01D 59/44* (2006.01)
*H01J 49/00* (2006.01)

(52) U.S. Cl. ....................... 250/290; 250/281; 250/282; 250/287; 250/288; 250/283; 250/292; 250/294

(58) Field of Classification Search ................. 250/281, 250/282, 290, 287, 283, 288, 292, 294
See application file for complete search history.

(56) References Cited

U.S. PATENT DOCUMENTS 5,179,278 A 1/1993 Douglas
5,420,425 A 5/1995 Bier et al.
6,177,668 B1 1/2001 Hager
6,297,500 B1 * 10/2001 Franzen et al. .............. 250/292
6,483,109 B1 11/2002 Reinhold et al.
6,504,148 B1 1/2003 Hager
6,545,268 B1 4/2003 Verentchikov et al.
6,627,883 B2 9/2003 Wang et al.
6,670,606 B2 12/2003 Verentchikov et al.
6,703,607 B2 3/2004 Stott et al.
6,831,275 B2 12/2004 Franzen et al.

(Continued)

FOREIGN PATENT DOCUMENTS

WO WO 2004/083805 A3 9/2004

(Continued)

OTHER PUBLICATIONS

Hashimoto, et al., "Mass Selective Ejection by Axial Resonant Excitation from a Linear Ion Trap," J. Am Soc Mass Spectrom, vol. 17,p. 685-690, (2006).

(Continued)

*Primary Examiner*—Jack I Berman
*Assistant Examiner*—Meenakshi S Sahu
(74) *Attorney, Agent, or Firm*—Charles B. Katz

(57) ABSTRACT

A dual ion trap mass analyzer includes adjacently positioned first and second two-dimensional ion traps respectively maintained at relatively high and low pressures. Functions favoring high pressure (cooling and fragmentation) may be performed in the first trap, and functions favoring low pressure (isolation and analytical scanning) may be performed in the second trap. Ions may be transferred between the first and second trap through a plate lens having a small aperture that presents a pumping restriction and allows different pressures to be maintained in the two traps. The differential-pressure environment of the dual ion trap mass analyzer facilitates the use of high-resolution analytical scan modes without sacrificing ion capture and fragmentation efficiencies.

30 Claims, 5 Drawing Sheets

U.S. PATENT DOCUMENTS

| | | | | |
|---|---|---|---|---|
| 6,838,666 | B2 | 1/2005 | Ouyang et al. | |
| 6,872,939 | B2 | 3/2005 | Bateman et al. | |
| 6,906,324 | B1 | 6/2005 | Wang et al. | |
| 6,949,743 | B1 | 9/2005 | Schwartz | |
| 6,960,762 | B2 | 11/2005 | Kawato et al. | |
| 7,034,292 | B1 | 4/2006 | Whitehouse et al. | |
| 7,145,133 | B2 | 12/2006 | Thomson | |
| 7,449,686 | B2 * | 11/2008 | Wang et al. | 250/292 |
| 2005/0269504 | A1 | 12/2005 | Hashimoto et al. | |
| 2006/0016979 | A1 | 1/2006 | Yang et al. | |
| 2007/0158545 | A1 | 7/2007 | Verentchikov | |

FOREIGN PATENT DOCUMENTS

WO WO 2005/083743 A2 9/2005

OTHER PUBLICATIONS

Wang, et al., "Simultaneously Using a Segmented Linear Quadrupole as a Collision Cell and an Ion Trap in a Dual Trap Q-q-Time-of-Flight Mass Spectrometer," Technical Publication, Bruker Daltonics Inc., p. 1-2.

Zerega, et al., "A Dual Quadrupole Ion Trap Mass Spectrometer," Int'l. J. of Mass Spectrom, vol. 190/191, p. 59-68, (1999).

Hager, James W., "A New Linear Ion Trap Mass Spectrometer," Rapid Commun. Mass Spectrom, vol. 16, p. 512-526, (2002).

Schwartz, et al., "A Two-Dimensional Quadrupole Ion Trap Mass Spectrometer," J. Am Soc Mass Spectrom, vol. 13, p. 659-669, (2002).

Williams, et al., "The Effects of Pulsed Introduction of Buffer Gas on Ion Storage and Detection Efficiencies in a Quadrupole Ion Trap," J. Am Soc Mass Spectrom, vol. 8, p. 532-538, (1997).

Xia, et al., "Mutual Storage Mode Ion/Ion Reactions in a Hybrid Linear Ion Trap," J. Am Soc Mass Spectrom, vol. 16, p. 71-81, (2005).

Rowe, et al., "Transport of Quantum States and Separation of Ions in a Dual RF Ion Trap," Quantum Information and Computation, Rinton Press, vol. 1 (No. 0), p. 1-15, (2001).

Gorshkov, et al., "A Dual-Trap Design and Its Applications in Electrospray Ionization FTICR Mass Spectrometry," Anal. Chem., vol. 69, p. 1307-1314, (1997).

Guan, et al., "Ehanced Mass Resolving Power, Sensitivity, and Selectivity in Laser Desorption Fourier Transform Ion Cyclotron Resonance Mass Spectrometry by Ion Axialization and Cooling," Anal. Chem., vol. 65, p. 1753-1757, (1993).

Hashimoto, et al., "Orthogonal Trap Time-Of-Flight Mass Spectrometer Using a Collisional Damping Chamber," Rapid Commun. Mass Spectrom, vol. 19, p. 221-226, (2005).

Hashimoto, et al., "Dual Linear Ion Trap/Orthogonal Acceleration Time-Of-Flight Mass Spectrometer with Improved Precursor Ion Selectivity," Rapid Commun. Mass Spectrom., vol. 19, p. 1485-1491, (2005).

* cited by examiner

DIFFERENTIAL-PRESSURE DUAL ION TRAP MASS ANALYZER AND METHODS OF USE THEREOF

FIELD OF THE INVENTION

The present invention relates generally to mass spectrometers, and more specifically to a differential-pressure, two-dimensional dual ion trap mass analyzer for use in a mass spectrometer system.

BACKGROUND OF THE INVENTION

The two-dimensional quadrupole ion trap mass analyzer (also referred to as the linear ion trap) is well known in the mass spectrometry art, and has become a valuable and widely-used tool for the analysis of a variety of compounds. Generally described, a two-dimensional ion trap consists of a set of four elongated electrodes to which a radio-frequency (RF) trapping voltage is applied in a prescribed phase relationship to radially confine ions to the trap interior. Axial confinement of the ions may be effected by application of a suitable direct current (DC) offset to end sections of the rod electrodes and/or electrodes located longitudinally outward of the rod electrodes. The mass spectrum of the trapped ions may be acquired by mass-sequentially ejecting the ions from the trap interior to an associated detector, either in a radial direction orthogonal to the central longitudinal axis of the ion trap, as described in U.S. Pat. No. 5,420,425 to Bier et al., or in an axial direction parallel to the central longitudinal axis, as described in U.S. Pat. No. 6,177,668 to Hager. The enlarged ion volume, greater trapping capacity, and higher trapping efficiency of the two-dimensional ion trap offers significant performance advantages (relative to the conventional three-dimensional ion trap), including enhanced sensitivity and the ability to perform an increased number of multiple stages of ion selection and fragmentation.

Successful operation of an ion trap mass analyzer requires the addition of a buffer gas (typically helium) to the trap interior. The buffer gas (also variously referred to in the art as damping or collision gas) serves two primary purposes. First, the buffer gas reduces the ions' kinetic energy via collisions. This reduction of kinetic energy is essential, not only for trapping ions injected into the trap, but also for kinetically cooling (damping) and spatially (both axially and radially) concentrating the ion cloud before mass analysis, resulting in useful mass spectral resolution and sensitivity. Second, the presence of the buffer gas enables efficient fragmentation of ions via collision activated dissociation (CAD) for tandem mass spectrometry (MS/MS or $MS^n$) analysis.

It is known, however, that collisions of ions with buffer gas during the ion isolation and mass-sequential ejection processes may be detrimental to mass spectral performance, both by reducing resolution and by contributing to chemical mass shifts that limit mass accuracy. Instrument designers have attempted to reduce these detrimental effects by selecting a buffer gas pressure (typically between 1-5 milliTorr) that provides adequate trapping/cooling and fragmentation action while minimizing the adverse influence on resolution and mass accuracy. While this "compromise pressure" approach has resulted in generally satisfactory instrument performance, there has been recent interest in modes of operation that favor lower pressures. It is known that higher resolution may be achieved by resonantly ejecting ions at values of the Mathieu parameter q which are somewhat lower than the stability limit value of 0.908. This gain in resolution may also be traded for more rapid scan rates, i.e., mass spectra having resolution equivalent to that obtained using standard techniques may be acquired more rapidly, thereby increasing sample throughput and/or increasing the numbers of $MS^n$ cycles that can be completed. Furthermore, ejection at reduced values of q offers other advantages, including expanded mass range scanning and the possibility of employing higher order resonances to increase ejection rates and/or provide higher mass-to-charge ratio (m/z) resolution. It is noted that the problem of chemically dependent mass shifts, which may increase significantly with lowered q ejection values in certain ion traps and under certain conditions, may present a potential obstacle to the use of reduced-q resonant ejection. Chemically dependent mass shift can be lessened by reducing the buffer gas pressure, but doing so has a substantial adverse effect on the ability to trap and cool ions, and to efficiently fragment ions via the CAD mechanism.

U.S. Pat. No. 6,960,762 to Kawato et al., while not specifically addressing reduced-q resonant ejection, describes an adaptation to a conventional three-dimensional ion trap that is designed to avoid the disadvantages arising from the presence of a buffer gas. In the Kawato et al. apparatus, the buffer gas is controllably added (via a pulsed valve) to the ion trap interior to raise the pressure to a value optimized for ion capture. After ions have been injected into the trap, the flow of the inert gas is reduced or terminated and the ion trap interior pressure is consequently lowered to a value optimized for the mass-sequential scan. By switching between the two pressures, the Kawato et al. apparatus purportedly achieves both excellent capture efficiency and scan resolution. However, the time needed to repeatedly change and stabilize the ion trap pressure may significantly lengthen the overall mass analysis cycle time and reduce sample throughput, particularly where high-capacity ion traps are employed.

At least one prior art reference discloses a dual-trap mass spectrometer architecture in which pressures in the traps are separately optimized for different functions. Zerega et al. ("A Dual Quadrupole Ion Trap Mass Spectrometer", *Int. J. Mass Spectrometry* 190/191 (1999) 59-68) describes a dual ion trap mass spectrometer consisting of a first three-dimensional quadrupole ion trap (referred to as the "preparation cell") operated at a pressure of approximately $10^{-4}$ Torr, which is coupled to a second three-dimensional quadrupole ion trap (referred to as the "mass analysis cell") operated at a pressure of about $10^{-7}$ Torr. In this mass spectrometer, ions are internally generated within the preparation cell and cooled by collisions with inert gas atoms to reduce the volume occupied by the ion cloud. The ions are then ejected from the preparation cell (by turning off the confinement voltage and applying suitable DC voltages to the end caps) through a small aperture in one of the end caps and travel to the mass analysis cell, where they are admitted into the cell's interior volume through an inlet aperture. The mass-to-charge ratios of the ions trapped in the mass analysis cell are determined by a complex technique based on measurement of the secular frequencies of the trapped ions via trajectory analysis, in which ions are confined within the trap for a prescribed period and then ejected (through an exit aperture) to a detector for generation of an ion signal representative of the ions' time-of-flight between the trap interior and the detector. This technique requires analysis of the ion signal as a function of confinement time, so several mass analysis cycles must be performed to obtain a complete mass spectrum. The complexity of the mass analysis technique disclosed in the Zerega et al. paper, as well as the need to execute several mass analysis cycles to generate a mass spectrum, disfavor commercial use of this apparatus.

SUMMARY

Roughly described, a dual-trap mass analyzer according to an embodiment of the present invention includes adjacently disposed first and second two-dimensional quadrupole ion traps operating at different pressures. The first ion trap has an interior volume maintained at a relatively high pressure, for example in the range of $5.0\times10^{-4}$ to $1.0\times10^{-2}$ Torr of helium, to promote efficient ion trapping, kinetic/spatial cooling, and fragmentation via a CAD process. The cooled (and optionally fragmented) ions are transferred through at least one ion optic element to the interior of the second ion trap, which is maintained at a significantly lower buffer gas pressure (for example, in the range of $1.0\times10^{-5}$ to $2.0\times10^{-4}$ Torr of helium) relative to the first ion trap pressure. The lower pressure in the second ion trap facilitates the acquisition of high-resolution mass spectra and/or use of higher scan rates while maintaining comparable m/z resolutions, and may also enable the utilization of reduced-q resonant ejection without incurring unacceptable levels of chemically dependant mass shift. In addition, the lower pressure region also allows the possibility of higher resolution ion isolation.

In a particular implementation of the dual-trap mass analyzer, the first and second ion traps reside in a common vacuum chamber, with the pressure differential between the traps being maintained by a pumping restriction, which may take the form of the aperture of a inter-trap plate lens separating the two traps. A buffer gas, such as helium, may be added to the interior of the first ion trap via a conduit to provide the desired buffer gas pressure. Both the first and second ion traps may have a conventional sectioned hyperbolic rod structure, and the central sections of a rod electrode pair of the second ion trap may be adapted with slots to permit the ejection of ions therethrough to detectors for acquisition of a mass spectrum. A single shared radio-frequency (RF) controller may be employed to apply the RF voltages to electrodes of both ion traps. Axial confinement of ions within the ion traps and transfer of ions between the traps may be achieved by application of the appropriate DC voltages to the rod electrode sections and/or to the inter-trap lens and lenses positioned axially outwardly of the front end of the first ion trap and the back end of the second ion trap.

The dual-trap mass analyzer of the foregoing description may be operated in a number of different modes. In one mode, ions are trapped and cooled in the first ion trap, and then transferred to the second ion trap for mass analysis (the term “mass analysis” is used herein to denote measurement of the mass-to-charge ratios of the trapped ions). In another mode, ions are trapped and cooled in the first trap, and precursor ions are selected (isolated) for fragmentation by ejecting from the first trap all ions outside of a mass-to-charge range of interest. In accordance with the CAD technique, the precursor ions are then kinetically excited and undergo energetic collisions with the buffer gas to produce product ions. The product ions are then transferred to the second ion trap for mass analysis. Yet another mode of operation makes use of the potential for high-resolution isolation in the second ion trap. In this mode, ions are trapped and cooled in the first ion trap and then transferred into the second ion trap. Precursor ions are then isolated in the second ion trap by ejecting all ions outside of a mass-to-charge range of interest. Due to the low pressure within the second ion trap, isolation may be effected at higher resolution and greater efficiency (less loss of precursor ions) than is attainable at higher pressures, so that precursor ion species may be selected with greater specificity. The precursor ions are then transferred back into the first ion trap and are thereafter fragmented by the aforementioned CAD technique. The resulting product ions are then transferred into the second ion trap for mass analysis. In a variant of this mode of operation, the precursor ions are accelerated to high velocities during transfer from the second ion trap to the first ion trap (by application of appropriate DC voltages to the rod electrodes and/or inter-trap lens) to produce a fragmentation pattern that approximates that occurring in the collision cell of conventional triple-stage quadrupole mass filter instruments. Other known dissociation or reaction techniques, including without limitation photodissociation, electron transfer dissociation (ETD), electron capture dissociation (ECD), and proton transfer reactions (PTR) may be used in place of or in addition to the CAD technique to yield product ions. The product ions may then be transferred back into the second ion trap for mass analysis.

The foregoing and other embodiments of the present invention avoid or reduce the limitations of prior art ion trap mass analyzers by providing a mass analyzer with regions of relatively high and low pressures, and by performing those functions favoring higher pressures (cooling and fragmentation) in the high-pressure region and others favoring low pressures (isolation and mass-sequential scans) in the low-pressure region.

DETAILED DESCRIPTION OF EMBODIMENTS

Figure 1:
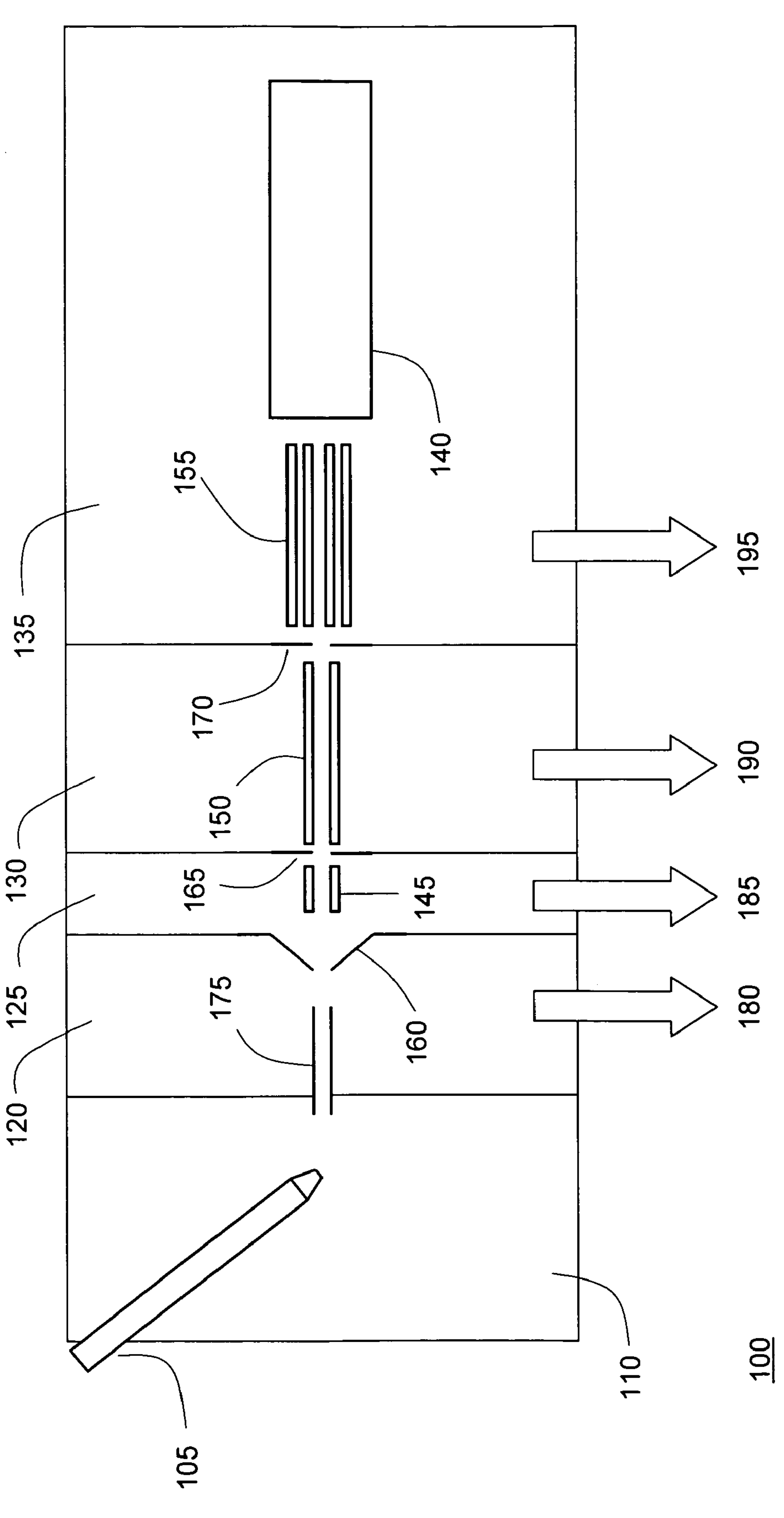
FIG. 1 is a symbolic diagram of a mass spectrometer that includes a differential-pressure dual ion trap mass analyzer, in accordance with an embodiment of the invention.

FIG. 1 depicts the components of a mass spectrometer 100 in which a differential-pressure dual ion trap mass analyzer may be implemented, in accordance with an embodiment of the present invention. It will be understood that certain features and configurations of mass spectrometer 100 are presented by way of illustrative examples, and should not be construed as limiting the differential-pressure dual ion trap mass analyzer to implementation in a specific environment. An ion source, which may take the form of an electrospray ion source 105, generates ions from an analyte material, for example the eluate from a liquid chromatograph (not depicted). The ions are transported from ion source chamber 110, which for an electrospray source will typically be held at or near atmospheric pressure, through several intermediate chambers 120, 125 and 130 of successively lower pressure, to a vacuum chamber 135 in which differential-pressure dual ion trap mass analyzer 140 resides. Efficient transport of ions from ion source 105 to mass analyzer 140 is facilitated by a number of ion optic components, including quadrupole RF ion guides 145 and 150, octopole RF ion guide 155, skimmer 160, and electrostatic lenses 165 and 170. Ions may be transported between ion source chamber 110 and first intermediate chamber 120 through an ion transfer tube 175 that is heated to evaporate residual solvent and break up solvent-analyte clusters. Intermediate chambers 120, 125 and 130 and vacuum chamber 135 are evacuated by a suitable arrangement of pumps to maintain the pressures therein at the desired values. In one example, intermediate chamber 120 communicates with a port 180 of a mechanical pump, and intermediate chambers 125 and 130 and vacuum chamber 130 communicate with corresponding ports 185, 190 and 195 of a multistage, multiport turbomolecular pump.

The operation of the various components of mass spectrometer 100 is directed by a control and data system (not depicted), which will typically consist of a combination of general-purpose and specialized processors, application-specific circuitry, and software and firmware instructions. The control and data system also provides data acquisition and post-acquisition data processing services.

While mass spectrometer 100 is depicted as being configured for an electrospray ion source, it should be noted that the dual ion trap mass analyzer 140 may be employed in connection with any number of pulsed or continuous ion sources (or combinations thereof), including without limitation a matrix assisted laser desorption/ionization (MALDI) source, an atmospheric pressure chemical ionization (APCI) source, an atmospheric pressure photo-ionization (APPI) source, an electron ionization (EI) source, or a chemical ionization (CI) ion source.

Figure 2:
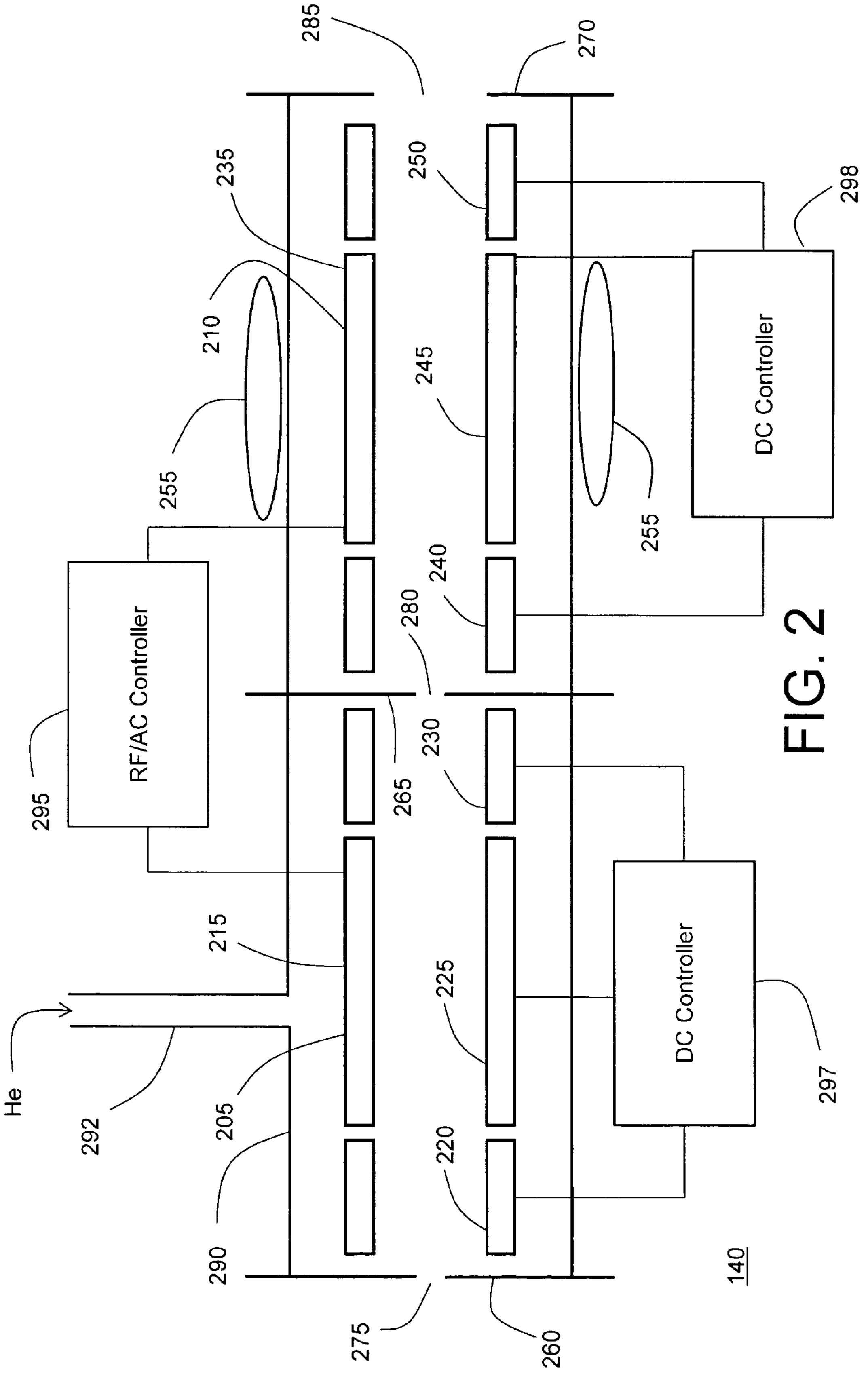
FIG. 2 is a symbolic diagram depicting components of the differential-pressure dual ion trap mass analyzer.

FIG. 2 is a schematic depiction of the major components of a dual ion trap mass analyzer 140, according to an embodiment of the present invention. Dual ion trap mass analyzer 140 includes first and second quadrupole traps 205 and 210 positioned adjacent to one another. For reasons that will become evident in view of the discussion set forth below, first quadrupole ion trap 205 will be referred to as the high-pressure trap (HPT), and second quadrupole ion trap 210 will be referred to as the low-pressure trap (LPT). It is noted that the term "adjacent", as used herein to describe the relative positioning of HPT 205 and LPT 210, is intended to denote that HPT 205 and LPT 210 are positioned in close proximity, but does not exclude the placement of one or more ion optic elements between the two traps—in fact, the preferred embodiment requires such an ion optic element.

The geometry and positioning of rod electrodes in two-dimensional quadrupole ion traps has been discussed extensively in the literature (see, e.g., the aforementioned U.S. Pat. No. 5,420,425, as well as Schwartz et al., "A Two-Dimensional Quadrupole Ion Trap Mass Spectrometer", *J. Am. Soc. Mass Spectrom.* 13:659 (2002)), and hence a detailed description of these aspects is not required and has been omitted. Generally described, a two-dimensional quadrupole ion trap may be constructed from four rod electrodes disposed about the trap interior. The rod electrodes are arranged into two pairs, each pair being opposed across the central longitudinal axis of the trap. In order to closely approximate a pure quadrupole field when the RF voltages are applied, each rod is formed with a truncated hyperbolic surface facing the trap interior. In other implementations, round (circular) or even planar (flat) electrodes can be substituted for the hyperbolic electrodes in order to reduce manufacturing complexity and cost, though such devices generally provide more limited performance. In a preferred implementation, each rod electrode is divided into three electrically isolated sections, consisting of front and back end sections flanking a central section. Sectioning of the rod electrodes allows the application of different DC potentials to each of the sections, such that ions may be primarily contained within a volume extending over a portion of the length of the trap. For example, positive ions may be concentrated within a central volume of the trap interior (which is roughly longitudinally co-extensive with the central sections of the rod electrodes) by raising the DC potential applied to the end sections relative to the central sections.

For the purpose of clarity, only a single electrode pair is depicted in FIG. 2 for HPT 205 and LPT 210. HPT 205 includes rod electrodes 215 each divided into front end section 220, central section 225, and back end section 230. Similarly, LPT 210 includes rod electrodes 235 each divided into front end section 240, central section 245, and back end section 250. Central sections 245 of rod electrodes 235 may be adapted with slots, in a manner known in the art, to permit radial ejection of ions through the slots to detectors 255 during an analytical scan. It is known that the presence of the slots in the rod electrodes introduces certain higher order field components in the trapping field, which may have undesirable effects on instrument performance. These effects may be avoided or minimized by stretching (increasing the inter-electrode spacing of) one of the electrode pairs, by modifying the surface geometry of the electrodes, or by unbalancing the RF voltages applied to the electrodes. The central sections 225 of electrodes 215 do not need to be adapted with slots, since HPT 205 is not used for analytical scans, and so HPT 205 is capable of generating a substantially pure quadrupolar trapping field; however, it may be desirable to utilize electrode geometries and spacings in HPT 205 that result in a departure from a substantially pure quadrupolar field in order, for example, to introduce higher order fields that improve or preserve resonant activation efficiency, to improve isolation resolution via separate x and y isolation waveforms for lower and higher m/z ion ejection, and/or to reduce manufacturing costs (e.g., by substituting round rod electrodes for hyperbolic-shaped electrodes, which are more difficult and expensive to machine). The optimal electrode design for HPT 205 will thus depend on considerations of functionality, performance and cost.

While the preferred embodiment of LPT 210 is configured for analytical scanning by radial (also referred to as orthogonal) ejection, other embodiments of the dual ion trap mass analyzer may configure LPT 210 for analytical scanning by axial scanning, in the manner taught by Hager in U.S. Pat. No. 6,177,668. In such a configuration, the detector(s) are located axially outward of the LPT, rather than radially outward of the LPT as in the preferred embodiment.

Dual ion trap mass analyzer 140 further includes a front lens 260, inter-trap lens 265, and back lens 270 respectively positioned in front of HPT 205, between HPT 205 and LPT 210, and in back of LPT 210. The lens structures are operable to perform various functions, including gating ions into HPT 205, transferring ions between HPT 205 and LPT 210, and assisting to axially confine ions within the traps. Each lens may take the form of a conductive plate having an aperture to which a DC voltage of controllable magnitude is applied. As will be discussed in further detail below, aperture 275 of front lens 260 and aperture 280 of inter-trap lens 265 have relatively small diameters (typically 0.060" and 0.080", respectively) to enable the pressure within the interior of HPT 205 to be significantly elevated relative to the pressure within LPT 210 and in locations of vacuum chamber 135 outside of mass analyzer 140. Aperture 285 of back lens 270 will typically have a considerably larger diameter (e.g., 0.500") relative to the other lens apertures to facilitate maintaining the pressure within LPT 210 at a value close to that in the region outside of mass analyzer 140. Other suitable lens structures may be substituted for the plate lens structures depicted and described herein. More specifically, inter-trap lens 265 could include in other implementations an RF lens, a multi-element lens system, or a short multipole. It is further noted that one or more of the lenses may be combined with other physical structures to provide the desired degree of pumping restriction.

A generally tubular enclosure 290 engages and seals to front lens 260, inter-trap lens 265 and back lens 270 to form an enclosure for HPT 205 and LPT 210. This arrangement enables the development of the desired pressures within HPT 205 and LPT 210 by restricting communication between the two traps and between each trap and the exterior region to flows occurring through the various apertures. Enclosure 290 may be adapted with elongated apertures to permit passage of ejected ions to detectors 255. While enclosure 290 is depicted as an integral structure extending around both HPT 205 and LPT 210, other implementations of dual trap mass analyzer 140 may utilize a construction in which the enclosure is formed in two or more parts (e.g., a first part enclosing HPT 205 and a second part enclosing LPT 210, or a first part enclosing both HPT 205 and LPT 210 and a second part enclosing only HPT 205). Such a construction may facilitate further tailoring of the pumping conductances. A buffer gas, typically helium, is added to the interior of HPT 205 via a conduit 292 that penetrates sidewall 290. The pressures that are maintained within HPT 205 and LPT 210 will depend on the buffer gas flow rate, the sizes of lens apertures 275, 280 and 285, the pressure of vacuum chamber 135, the construction of enclosure 290 (including any apertures formed therein) and the associated pumping speed 195 of the pumping port for vacuum chamber 135. In typical implementations of dual trap mass analyzer 140, the pressure within HPT 205 is maintained at a value in the range of $5.0\times10^{-4}$ to $1.0\times10^{-2}$ Torr of helium, and the pressure within LPT 210 is maintained at a value in the range of $1.0\times10^{-5}$ to $3.0\times10^{-3}$ Torr of helium. More preferably (as presently contemplated), HPT 205 pressure may be in the range of $1.0\times10^{-3}$ to $3.0\times10^{-3}$ Torr of helium, and LPT pressure may be in the range of $1.0\times10^{-4}$ to $1.0\times10^{-3}$ Torr of helium In this manner, the pressures are separately optimized for the functions of cooling and fragmentation (in HPT trap 205) and for isolation and analytical scans (in LPT trap 210). It should be noted that the foregoing pressure ranges are presented by way of example only, and should not be construed as limiting the scope of the invention to operation at any specific pressure or range or pressures.

Oscillating voltages, including the main RF (trapping) voltage and supplemental AC voltages (for resonant ejection, isolation and CAD), are applied to the electrodes of HPT 205 and LPT 210 by RF/AC controller 295. To reduce instrument complexity and manufacturing cost, HPT 205 and LPT 210 may be wired in parallel to a shared RF/AC controller, such that identical oscillating voltages are applied to both traps. There may, however, be certain applications where it is desirable to concurrently perform different functions in the traps. For example, one may wish to increase duty cycle by accumulating and cooling incoming ions in HPT 205 while LPT is executing an analytical scan of an earlier accumulated group of ions. These applications may require applying different RF/AC voltages to HPT 205 and LPT 210, which would necessitate use of separate RF/AC controllers for the two traps. DC voltages are respectively applied to the electrodes of HPT 205 and LPT 210 by DC controllers 297 and 298. As discussed above, it is known to apply different DC bias voltages to the end and central sections of the traps in order to concentrate ions within a volume extending over a portion of the length of the trap, e.g., a central volume corresponding to the central sections.

It should be recognized that other implementations of the dual trap mass analyzer may switch the positions of the LPT and HPT relative to the configuration depicted in FIG. 1. In such an implementation, ions arriving from the ion source would first pass through the LPT into the HPT, where they would be trapped and kinetically cooled (and optionally fragmented) before being returned to the LPT for mass analysis (or isolation), in the manner described below in connection with FIGS. 3-5.

Figure 3:
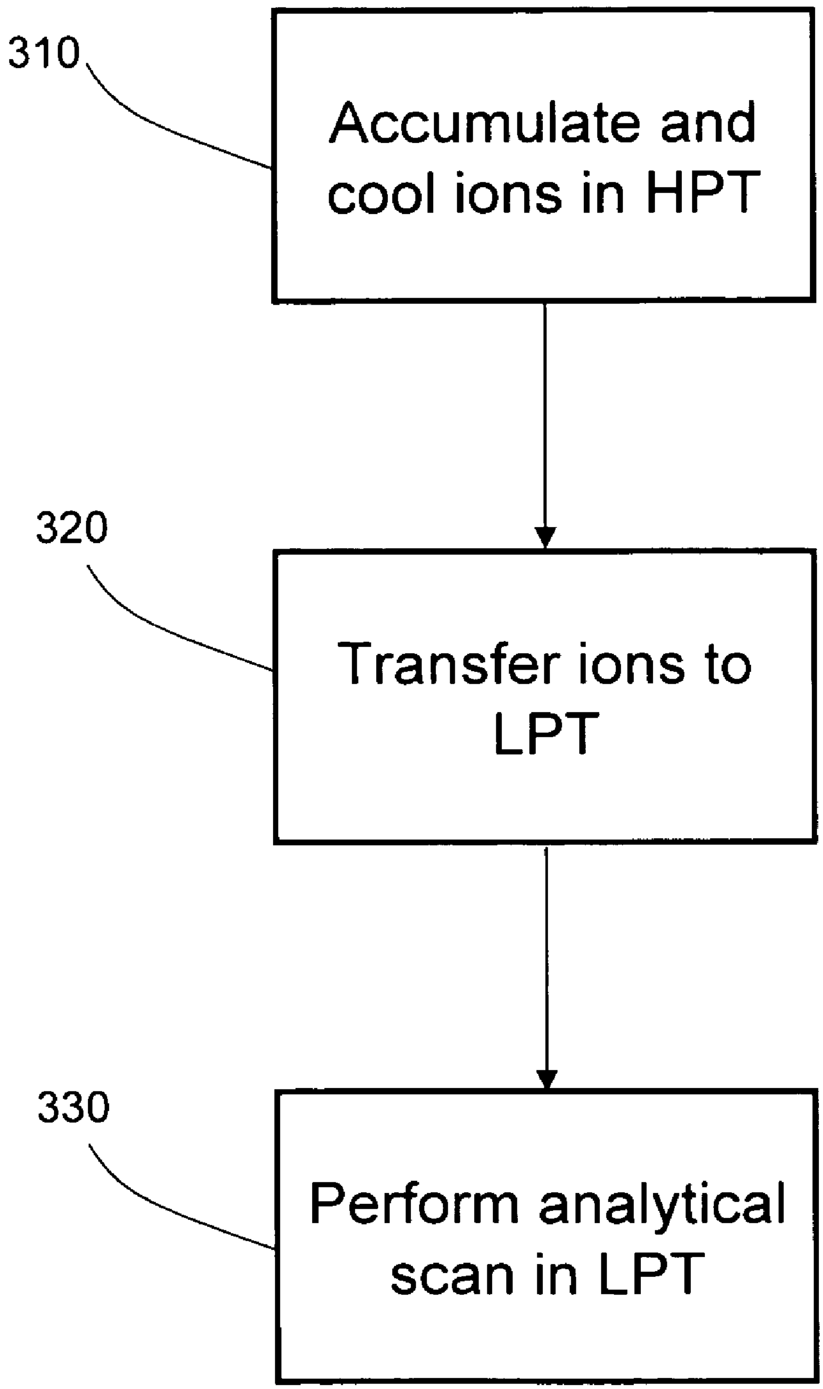
FIG. 3 is a flowchart depicting the steps of a first method for operating the differential-pressure dual ion trap mass analyzer of FIG. 2.
Figure 4:
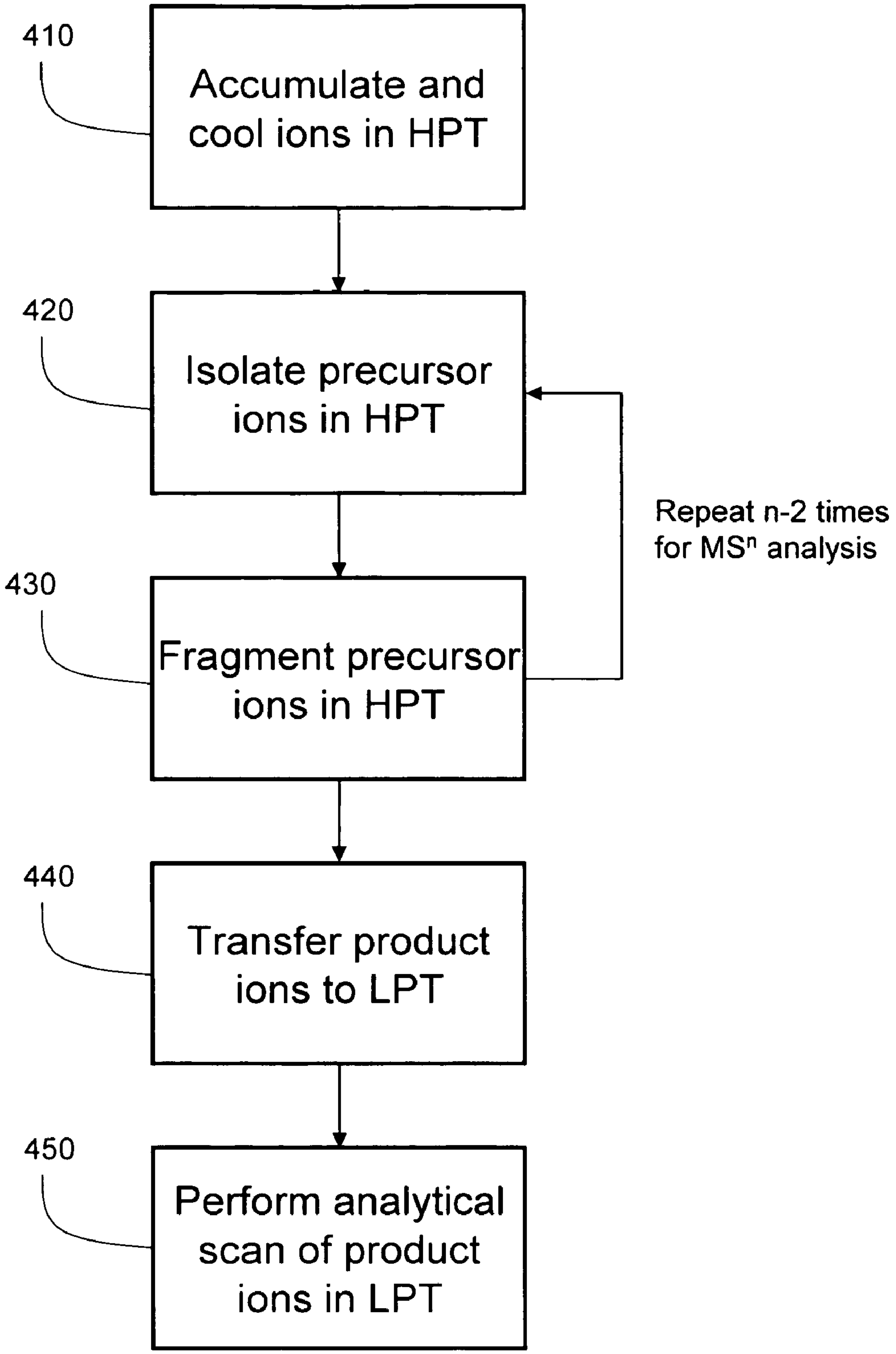
FIG. 4 is a flowchart depicting the steps of a second method for operating the differential-pressure dual ion trap mass analyzer of FIG. 2, whereby ions are isolated and fragmented in the first ion trap.
Figure 5:
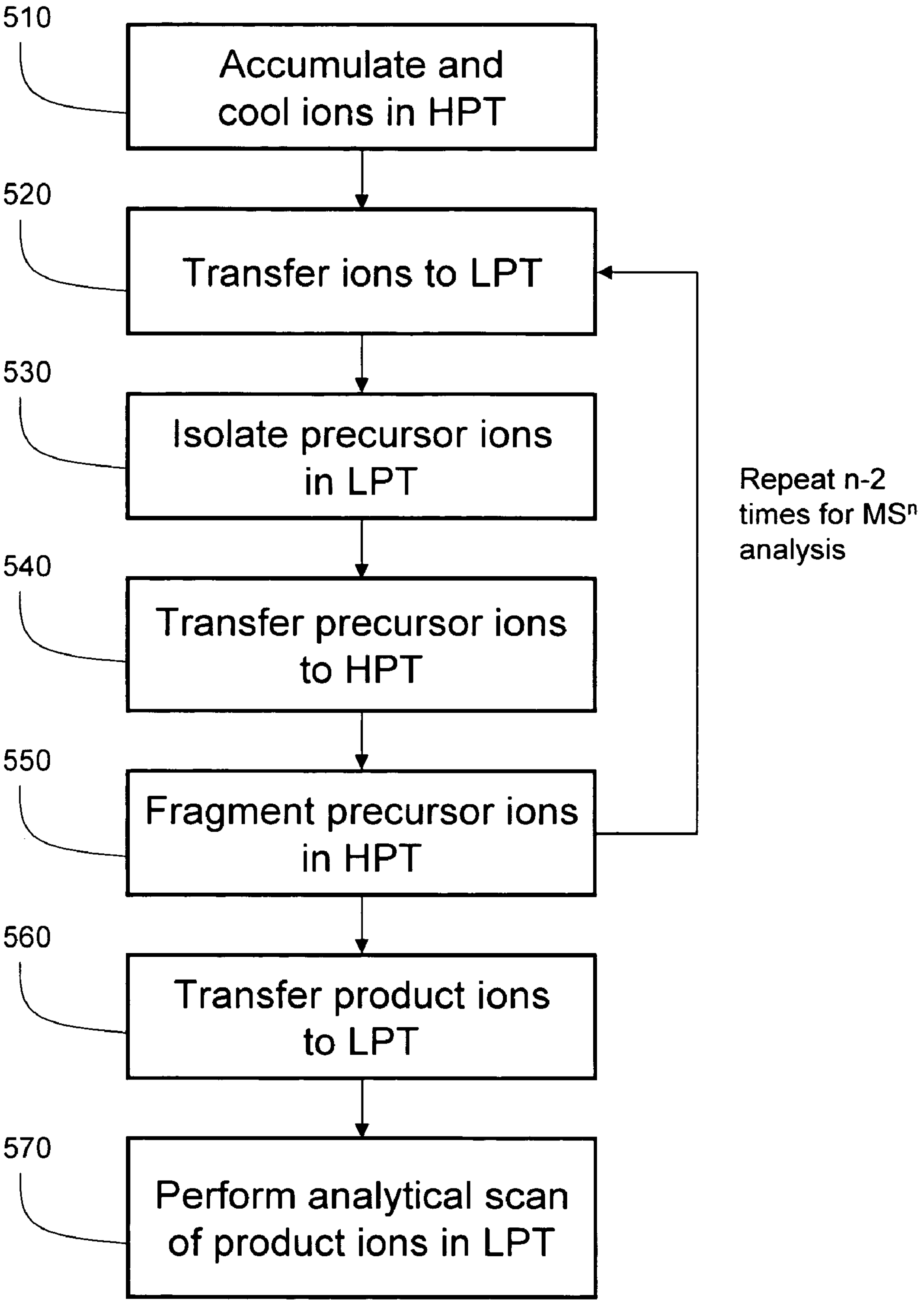
FIG. 5 is a flowchart depicting the steps of a third method for operating the differential-pressure dual ion trap mass analyzer of FIG. 2, whereby ions are isolated in the second ion trap and fragmented in the first ion trap.

FIGS. 3-5 illustrate various methods of operating dual ion trap mass analyzer 140 for mass analysis of an analyte substance. It should be recognized that these methods are presented as examples of how a mass analyzer of the present invention may be advantageously employed, and should not be construed as limiting the invention to a particular mode of operation. Referring initially to step 310 of FIG. 3, ions produced in ion source 105 and transported through the various ion optic components are accumulated in the interior volume of HPT 205. Gating of ions into HPT 205 may be accomplished by adjusting the DC voltage applied to front lens 260. After a sufficient number of ions have been accumulated within HPT 205 (noting that the duration of the accumulation period may be determined by an appropriate automatic gain control technique), the DC voltage applied to front lens 260 is changed to prevent entry of additional ions into HPT 205. As known in the art, trapping of the accumulated ions within HPT 205 is achieved by a combination of radial confinement using RF voltages applied to rod electrodes 215 (more specifically, by applying opposite phases of an oscillating voltage to the two rod pairs), and axial confinement using DC voltages applied to end sections 220 and 230, central section 225, front lens 260 and inter-trap lens 265. DC voltages applied to back end section 230 and/or inter-trap lens 265 create a potential barrier that prevents movement of ions from HPT 205 to LPT 210. The trapped ions are retained within HPT 205 for a period sufficient to effect cooling of ions via collisions with the buffer gas, which will typically be on the order of 1-5 milliseconds.

It is noted that the differential-pressure configuration of dual ion trap mass analyzer 140 offers substantial advantages over the prior art in terms of its ability to capture and trap fragile ions (e.g., ions of n-alkanes generated via electron ionization) without causing unintended fragmentation. Ions arriving at the entrance to an ion trap will typically have a kinetic energy spread that exceeds the amount of kinetic energy that is collisionally removed during one pass through the length of the linear trap and back when the trap is operated with normal buffer gas pressures. This results in a portion of the injected ions being "bounced" out of the interior of a conventional ion trap, thereby reducing injection efficiency and decreasing the number of ions available for mass analysis. Injection efficiency may be improved in a conventional ion trap by increasing the buffer gas pressure, but, as discussed above, operation at higher buffer gas pressure has an adverse effect on analytical scan and isolation resolutions. Injection efficiency may also be improved by accelerating the injected ions so that more energy is lost per collision. However, accelerating the ions to higher kinetic energies also produces more undesired fragmentation of fragile ions. The design of dual ion trap mass analyzer 140, which effectively partitions the ion capture and analytical scan functions in HPT 205 and LPT 210, respectively, allows the use of high buffer gas pressures in HPT 205 to facilitate good collisional energy removal and consequent capture efficiency without compromising analytical scan resolution or speed.

Following the accumulation and cooling step, the cooled ions are transferred into the interior volume of LPT 210, step 320. Transfer of ions between the two traps is performed by changing the DC voltage applied to inter-trap lens 265 (and possibly to one or more sections of rod electrodes 215 and/or rod electrodes 235) to remove the potential barrier between the two traps and create a potential well within LPT 210. Ions then flow from the interior of HPT 205 through aperture 275 to the interior of LPT 210. It is generally desirable to perform the transfer step in a manner that does not substantially increase the kinetic energy of the ions and/or cause them to undergo energetic collisions leading to fragmentation. Radial and axial confinement of ions within LPT 210 are respectively effected by RF voltages applied to rod electrodes 235 and by DC voltages applied to end sections 240 and 250, central section 245, inter-trap lens 265 and back lens 270.

After the ions have been transferred to and are trapped within LPT 210, an analytical scan is executed by mass-sequentially ejecting ions to detectors 255 in order to acquire a mass spectrum, step 330. Mass-sequential ejection is conventionally performed in a two-dimensional quadrupole ion trap by applying an oscillatory resonance excitation voltage across the slotted rod electrode pair (e.g., rod electrodes 235) and ramping the amplitude of the main RF (trapping) voltage applied to the rod electrodes. The ions come into resonance with the associated excitation field in order of their mass-to-charge ratios. The resonantly excited ions experience a progressive increase in their trajectory amplitudes, which eventually exceeds the inner dimension of LPT 210 and causes the ions to be ejected to detectors 255, which responsively generate a signal representative of the number of ions ejected. This signal is conveyed to the data system for further processing to generate a mass spectrum.

The value of the Mathieu parameter q at which ions are resonantly ejected will depend on the frequency of the resonance excitation voltage. As discussed above in the background section, there is current interest in resonantly ejecting ions at a relatively low value of q in order to obtain higher resolution while extending m/z scan ranges and/or to enable faster scan rates. Ions may be resonantly ejected at any operationally useful value of q below the mass instability limit (e.g., between 0.05 and 0.90), but reduced-q resonant ejection will more preferably take place in the range of $0.6 \leqq q \leqq 0.83$. It is known (see, e.g., U.S. Pat. Nos. 6,297,500 and 6,831,275 to Franzen) that further enhancements in resolution or increases in scan speed can be obtained by selecting a value of q for resonant ejection at which resonances exist, some of which are at frequencies which are integer fractions of the trapping RF voltage frequency (for example, at q=0.64, the resonance frequency is ¼ of the trapping RF voltage frequency). The dual ion trap mass analyzer of the present invention enables the practical use of reduced-q resonant ejection by executing the analytical scan within the low-pressure environment of LPT 210, thereby avoiding multiple ion-buffer gas collisions during the scanning process that would lead to reduced resolution and possibly higher levels of chemical mass shift.

It should be recognized that although reference is made herein to executing the analytical scan at relatively low values of q, step 330 may also be performed in a more conventional fashion at higher values of q (e.g., q=0.88) without departing from the scope of the invention. Furthermore, some embodiments of the invention may mass-sequentially eject ions in an axial direction, rather than in the radial direction.

FIG. 4 is a flowchart depicting steps of a method for performing MS/MS analysis using dual ion trap mass analyzer 140. In step 410, ions are accumulated and cooled within HPT 205 in substantially the same manner discussed above in connection with step 310 of the FIG. 3 flowchart. Next, in step 420, precursor ions having mass-to-charge ratios within a range of interest are isolated in HPT 205. The mass-to-charge ratio range of interest may be automatically determined, for example, via a data-dependent process by analyzing a previously-acquired mass spectrum using predefined criteria. Precursor ion isolation may be achieved, in a manner known in the art, by applying to rod electrodes 215 a broadband excitation signal having a frequency notch corresponding to the secular frequencies of the precursor ions. This causes substantially all of the ions having mass-to-charge ratios outside of the range of interest to be kinetically excited and removed from HPT 205 (either by ejection through gaps between rod electrodes 215, or by striking electrode surfaces), while the precursor ions are retained within HPT 205.

In step 430, the precursor ions previously selected in step 420 are fragmented to produce product ions. Fragmentation may be accomplished by the prior art CAD technique, whereby an excitation voltage having a frequency matching the secular frequency of the precursor ions is applied to rod electrodes 215 to kinetically excite the precursor ions and causing them to undergo energetic collisions with the buffer gas. A variant of the CAD technique, referred to as pulsed-q dissociation (PQD) and described in U.S. Pat. No. 6,949,743 to Schwartz, may be employed in place of conventional CAD. In the PQD technique, the RF trapping voltage is increased prior to or during the period of kinetic excitation to provide for more energetic collisional activation, and then reduced after a short delay period following termination of the excitation voltage in order to retain relatively low mass product ions in the trap. Other suitable dissociation techniques, including photodissociation, electron capture dissociation (ECD) and electron transfer dissociation (ETD) may be used to fragment ions in step 430. The product ions may be cooled for a predetermined period of time in HPT 205 to reduce kinetic energy and focus them to the trap centerline. It is noted that steps 420 and 430 may be repeated one or more times to perform multiple stages of isolation and fragmentation to perform $MS^n$ analyses, e.g., a product ion of interest may be further isolated in HPT 205 and fragmented to enable $MS^3$ analysis.

Next, in step 440, the product ions formed in step 430 are then transferred to LPT 210 in substantially the same manner described above in connection with step 320 of FIG. 3. In step 450, LPT 210 executes an analytical scan of the product ions, as described above in connection with step 330, to generate a mass spectrum of the product ions.

FIG. 5 is a flowchart depicting steps of another method for performing MS/MS analysis using dual ion trap mass analyzer 140. In contrast to the method of FIG. 4, isolation of the precursor ions is performed in LPT 210 rather than in HPT 205. Ions are first accumulated and cooled in HPT 205, step 510, in the same manner described above in connection with step 310 of FIG. 3. The cooled ions are then transferred to HPT 210, step 520, as is described above in connection with step 320. In step 530, precursor ions are isolated in LPT 210. Precursor ion isolation in LPT 210 may be accomplished by application of a notched broadband signal to rod electrodes 235, with the frequency notch corresponding to the secular frequencies of the mass-to-charge ratio range of interest. It is believed lower buffer gas pressures allow use of isolation waveforms wherein the width of the frequency notch can be relatively narrow while still retaining a useful number of ions, thereby providing greater precursor ion m/z selectivity. Hence higher isolation resolution may be achievable in LPT 210 due its lower buffer gas pressure.

Precursor ions isolated in step 530 are thereafter transferred back into HPT 205, step 540. Transfer of ions from LPT 210 to HPT 205 may be effected by changing the DC voltage applied to inter-trap lens 265 (and possibly to one or more sections of rod electrodes 215 and/or rod electrodes 235) to remove the potential barrier between the two traps and create a potential well within HPT 205. Ions then flow from the interior of LPT 210 through aperture 280 to the interior of HPT 205 and are trapped therein.

Next, in step 550, the precursor ions trapped within HPT 205 are fragmented by an appropriate dissociation technique to produce product ions, as is described above in connection with step 430 of FIG. 4. It is noted that fragmentation is carried out in HPT 205 rather than in LPT 210 because the buffer gas pressure in LPT 210 is inadequate for efficient collision-based dissociation methods. For dissociation methods that do not rely on collisions with buffer gas atoms or molecules (such as photodissociation), fragmentation may be performed in LPT 210, obviating the need to transfer the isolated precursor ions back into HPT 205.

Steps 520 through 550 may be repeated one or more times to perform multiple stages of isolation and fragmentation, e.g., a product ion of interest may be transferred to and isolated in LPT 210, and then transferred back to HPT 205 and fragmented to enable $MS^3$ analysis.

In a variant of the CAD technique outlined above, fragmentation may be accomplished in step 550 by accelerating the ions to a high velocity during the transfer step 540. This can be done for positive analyte ions by raising DC potentials applied to front end section 240 of LPT 210, inter-trap lens 265, and back end section 230 of HPT 205 relative to the remaining electrodes of HPT 205 (and by raising the DC potential applied to front lens 260 to ensure that ions remain axially confined within HPT 205). The accelerated ions collide at high velocity with buffer gas in HPT 205, producing fragmentation analogous to that occurring in a collision cell of a triple quadrupole mass spectrometer or similar instrument. For this fragmentation mode, it may be advantageous to use a more massive buffer gas such as nitrogen (28 amu) or argon (40 amu) in HPT 205, as this allows greater internal energy uptake per collision. It should be noted that high pressures of nitrogen and argon (typically above $2\times10^{-5}$ torr) are disfavored in conventional ion traps, because such conditions compromise the performance of the m/z analysis process. The dual trap configuration of embodiments of the invention allow use of heavier buffer/target/collision gases for CAD without compromising performance in m/z scanning.

Again, product ions formed in HPT 205 may be cooled for a predetermined period to reduce kinetic energy and focus them to the trap centerline. In step 560, the product ions formed in step 550 are then transferred to LPT 210 in substantially the same manner described above in connection with step 320 of FIG. 3. In step 570, LPT 210 executes an analytical scan of the product ions, as described above in connection with step 330, to generate a mass spectrum of the product ions.

While the MS/MS methods described above in connection with FIGS. 4 and 5 perform fragmentation in HPT 205, there are certain dissociation techniques, such as photodissociation, which are more efficiently implemented in a low-pressure environment. For dissociation techniques of this nature, it would be advantageous to perform the fragmentation step in LPT 210 rather than HPT 205.

The foregoing description of an embodiment of the dual ion trap mass analyzer assumes that the LPT is provided with a set of detectors, and that ions are mass-sequentially ejected to the detectors during the analytical scan for acquisition of a mass spectrum. In alternative embodiments, some or all of the ejected ions may be directed to a downstream mass analyzer (which may take the form, for example, of an Orbitrap mass analyzer, a Fourier Transform/Ion Cyclotron Resonance (FTICR) analyzer, or a time-of-flight (TOF) mass analyzer), in which the mass spectrum of the ejected ions (or their fragments, if a collision or reaction cell is interposed between the LPT and the downstream mass analyzer) is acquired by conventional means. A planar ion guide/collision cell, of the type described in PCT Publication No. WO2004/083805 by Makarov et al., may be utilized in such a configuration to efficiently transport ions from the LPT to the downstream mass analyzer and to focus the ribbon-shaped ion beam emerging from the slot in the HPT central electrode section to a narrow circular beam that may be more easily applied to the downstream mass analyzer entrance.

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A dual trap mass analyzer for a mass spectrometer, comprising:

a first two-dimensional quadrupole ion trap having an interior region maintained at a first pressure, the first ion trap being configured to receive, confine, and cool ions;

a second two-dimensional quadrupole ion trap positioned adjacently to the first ion trap and having an interior region maintained at a second pressure substantially below the first pressure, the second ion trap being configured to receive and confine ions transferred from the first two-dimensional ion trap and to mass sequentially eject the ions to a detector to produce a mass spectrum; and at least one ion optic element disposed between the first and second ion traps configured to control the transfer of ions therebetween.

2. The dual trap mass analyzer of claim 1, wherein the first ion trap is further configured to fragment ions into product ions, and wherein the product ions are thereafter transferred to the second ion trap for mass analysis.

3. The dual trap mass analyzer of claim 2, wherein precursor ions are isolated in the first ion trap prior to fragmentation.

4. The dual trap mass analyzer of claim 2, wherein precursor ions are isolated in the second ion trap and transferred back to the first ion trap for fragmentation.

5. The dual trap mass analyzer of claim 4, wherein the precursor ions are accelerated to high velocities during transfer from the second ion trap to the first ion trap to cause the precursor ions to undergo energetic collisions with buffer gas molecules or atoms in the first ion trap.

6. The dual trap mass analyzer of claim 2, wherein the first ion trap is configured to fragment ions by collision activated dissociation.

7. The dual trap apparatus of claim 1, wherein the first pressure is between $10\times10^{-3}$ and $3.0\times10^{-3}$ Torr of helium.

8. The dual trap apparatus of claim 1, wherein the second pressure is between $1.0\times10^{-4}$ to $1.0\times10^{-3}$ Torr of helium.

9. The dual trap mass analyzer of claim 1, wherein the first and second ion traps reside in a common vacuum chamber.

10. The dual trap mass analyzer of claim 1, wherein the at least one ion optic element includes an electrostatic plate lens having an aperture, the aperture presenting a pumping restriction enabling the pressure differential between the first and second ion traps.

11. The dual trap mass analyzer of claim 1, wherein ions are mass-sequentially ejected from the second ion trap in a radial direction.

12. The dual trap mass analyzer of claim 1, wherein ions are mass-sequentially ejected at a value of q between 0.6 and 0.83.

13. The dual trap mass analyzer of claim 1, wherein ions are mass-sequentially ejected at a value of q between 0.05 and 0.9.

14. The dual trap mass analyzer of claim 1, further comprising a front lens positioned in front of the first ion trap, and a back lens being positioned in back of the second ion trap.

15. A mass spectrometer, comprising:

an ion source for generating ions from an analyte substance;

ion optics for transporting the ions to a dual trap mass analyzer, the dual trap mass analyzer including:

a first two-dimensional quadrupole ion trap having an interior region maintained at a first pressure, the first ion trap being configured to receive, confine, and cool ions;

a second two-dimensional quadrupole ion trap positioned adjacent to the first ion trap and having an interior region maintained at a second pressure substantially below the first pressure, the second ion trap being configured to receive and confine ions transferred from the first two-dimensional ion trap and to mass sequentially eject the ions to a detector to produce a mass spectrum; and at least one ion optic element disposed between the first and second ion traps configured to control the transfer of ions therebetween.

16. The mass spectrometer of claim 15, wherein the first ion trap is further configured to fragment ions into product ions, and wherein the product ions are thereafter transferred to the second ion trap for mass analysis.

17. The mass spectrometer of claim 16, wherein precursor ions are isolated in the first ion trap prior to fragmentation.

18. The mass spectrometer of claim 16, wherein precursor ions are isolated in the second ion trap and transferred back to the first ion trap for fragmentation.

19. The mass spectrometer of claim 18, wherein the precursor ions are accelerated to high velocities during transfer from the second ion trap to the first ion trap to cause the precursor ions to undergo energetic collisions with buffer gas molecules or atoms in the first ion trap.

20. The mass spectrometer of claim 16, wherein the first ion trap is configured to fragment ions by collision activated dissociation.

21. The mass spectrometer of claim 15, wherein the first pressure is between $1.0\times10^{-3}$ and $3.0\times10^{-3}$ Torr of helium.

22. The mass spectrometer of claim 15, wherein the second pressure is between $1.0\times10^{-4}$ to $1.0\times10^{-3}$ Torr of helium.

23. The mass spectrometer of claim 15, wherein the first and second ion traps reside in a common vacuum chamber.

24. The mass spectrometer of claim 15, wherein the at least one ion optic element includes an electrostatic plate lens having an aperture, the aperture presenting a pumping restriction enabling the pressure differential between the first and second ion traps.

25. The mass spectrometer of claim 15, wherein ions are mass-sequentially ejected from the second ion trap in a radial direction.

26. The mass spectrometer of claim 15, wherein ions are mass-sequentially ejected at a value of q between 0.6 and 0.83.

27. The mass spectrometer of claim 15, further comprising a front lens positioned in front of the first ion trap, and a back lens being positioned in back of the second ion trap.

28. The mass spectrometer of claim 15, wherein ions are mass-sequentially ejected at a value of q between 0.05 and 0.9.

29. A mass spectrometer, comprising:

an ion source for generating ions from an analyte substance;

ion optics for transporting the ions to a dual trap mass analyzer, the dual trap mass analyzer including:

a first two-dimensional quadrupole ion trap having an interior region maintained at a first pressure, the first ion trap being configured to receive, confine, and cool ions;

a second two-dimensional quadrupole ion trap positioned adjacent to the first ion trap and having an interior region maintained at a second pressure substantially below the first pressure, the second ion trap being configured to receive and confine ions transferred from the first two-dimensional ion trap and to mass sequentially eject the ions; and at least one ion optic element disposed between the first and second ion traps configured to control the transfer of ions therebetween; and a second mass analyzer positioned to receive ions ejected from the second two-dimensional quadrupole ion trap, or fragment ions derived from the ejected ions, and configured to acquire a mass spectrum of the ejected ions or product ions.

30. The dual trap mass analyzer of claim 2, wherein the second ion trap is configured to fragment ions by photodissociation.

* * * * *

UNITED STATES PATENT AND TRADEMARK OFFICE

CERTIFICATE OF CORRECTION

PATENT NO. : 7,692,142 B2
APPLICATION NO. : 11/639273
DATED : April 6, 2010
INVENTOR(S) : Schwartz et al.

It is certified that error appears in the above-identified patent and that said Letters Patent is hereby corrected as shown below:

Claim 7, column 12, line 63 replace "pressure is between $10\times10^{-3}$ and $3.0\times10^{-3}$ Torr of helium"

with --pressure is between $1.0\times10^{-3}$ and $3.0\times10^{-3}$ Torr of helium--

Signed and Sealed this

Twenty-ninth Day of June, 2010

David J. Kappos
*Director of the United States Patent and Trademark Office*